United States Patent [19]

Skay

[11] 4,202,300
[45] May 13, 1980

[54] INTERNAL COMBUSTION ENGINE

[76] Inventor: Frank Skay, 35 Rex Park, Canada Creek Ranch, Atlanta, Mich. 49709

[21] Appl. No.: 880,287

[22] Filed: Feb. 22, 1978

[51] Int. Cl.² .................. F02D 39/02; F02B 33/00
[52] U.S. Cl. .................... 123/75 B; 123/48 D; 123/119 C; 123/59 EC
[58] Field of Search ........... 123/75 B, 78 R, 78 A, 123/78 D, 48 R, 48 A, 48 AA, 48 D, 119 C, 32 C, 32 ST, 32 SP, 32 K, 191 S, 191 SP, DIG. 4, 59 BM, 59 EC

[56] References Cited

U.S. PATENT DOCUMENTS

| 1,272,305 | 7/1918 | Paget | 123/78 A |
|---|---|---|---|
| 1,443,885 | 1/1923 | Owen | 123/75 B |
| 1,601,548 | 9/1926 | Zier et al. | 123/59 A |
| 1,638,287 | 8/1927 | Burtnett | 123/75 B |
| 1,730,093 | 10/1929 | Richli | 123/59 BA |
| 2,346,458 | 4/1944 | Sanders | 123/75 B |
| 2,453,377 | 11/1948 | Lozivit | 123/75 B |
| 2,799,257 | 7/1957 | Stümpfig et al. | 123/32 SP |
| 3,192,912 | 7/1965 | Stümpfig | 123/191 S |
| 3,919,985 | 11/1975 | Yagi et al. | 123/33 VC |
| 4,033,304 | 7/1977 | Luria | 123/90.15 |

FOREIGN PATENT DOCUMENTS

2401509  7/1975  Fed. Rep. of Germany ........ 123/78 D

Primary Examiner—Ronald H. Lazarus
Assistant Examiner—M. Moy
Attorney, Agent, or Firm—McGlynn and Milton

[57] ABSTRACT

In an internal combustion engine intended to provide high fuel economy, low noxious emissions and high power, a pair of four cycle power cylinders are alternately fed by a two cycle charge cylinder in which a rich air/fuel mixture is compressed and delivered alternately to variable volume charge chambers communicating with the power cylinders, the three cylinders operating off a common crankshaft. A lean air/fuel mixture is inducted to each power cylinder on its intake stroke. Ignition occurs in the charge chamber and the flame front moves therefrom into the lean mixture in the power cylinder. The volume of the charge chamber may be varied in response to power requirements of the engine. A valve between the charge cylinder and charge chamber blocks flow therebetween during ignition and provides a restricted orifice between the charge chamber and power cylinder during the compression stroke controlling flow therebetween.

62 Claims, 9 Drawing Figures

INTERNAL COMBUSTION ENGINE

FIELD OF INVENTION

This invention relates to internal combustion engines of a kind particularly intended for delivering variable power with a high fuel economy and low noxious emission such as required in reciprocating piston engines.

BACKGROUND OF INVENTION

Despite the demand for and substantial efforts by others to provide a high fuel economy, low noxious emissions, high power engine at a reasonable cost, the various problems to be solved continue and the need for such an engine remains. My research has led me in the direction of providing multiple power cylinders fed by charge cylinders in which a rich air/fuel ratio is compressed for delivery to the power cylinders. The prior art shows that various inventors have suggested combinations of power and charge cylinders, for example: U.S. Pat. Nos. 789,047, 603,914, 954,577, 938,633, 1,248,250, 1,197,951, and 1,601,548.

Generally, however, the cited patents do not compress the mixture of the charge cylinder with the intent of providing additional power, but rather store the mixture and regulate its discharge into the power cylinders. U.S. Pat. No. 1,601,548 is an exception to this generalization and compresses a rich air/fuel mixture within the charge cylinder. However, the port to the power cylinder on the charge cylinder is continually open until ignition thereby permitting compression of both the charge cylinder and power cylinder gases at the same time. This results in a highly inefficient engine since additional fuel consumption would be necessary for injection of a rich air/fuel mixture into both power and charge cylinders and the rich air/fuel mixture would not be injected into a charge chamber to precharge the chamber where ignition would occur. Consequently, the charge cylinder of U.S. Pat. No. 1,601,548 is merely assisting the power piston in compressing the air/fuel mixture within the power cylinder.

Representative of charge chambers in the prior art are U.S. Pat. Nos. 1,998,785, 2,914,041, and 3,304,922. Each of these patents illustrate various methods for delivering and retaining a rich fuel mixture adjacent the ignition means. U.S. Pat. Nos. 3,304,922 and 2,914,041 use power piston compression for retaining the rich fuel mixture adjacent the ignition means. However, the rich fuel is injected downward into the combustion area and mixes with the lean fuel prior to the power piston reaching top dead center. In U.S. Pat. No. 1,998,785 the rich mixture is injected into a preliminary chamber substantially apart from the main combustion chamber which could produce retardation of the flame front. Moreover, neither chamber is a variable volume chamber for adjusting compression within the power cylinder.

The prior art also reveals various combinations of multiple pistons for varying the main combustion chamber compression: U.S. Pat. Nos. 2,419,450, 2,154,505, 3,964,452, 1,022,390, 1,817,747, and 1,559,710. These patents work under the theory that a certain combustible fuel has a compression at which it best performs when ignited. However, the overall performance of the engine can vary according to other engine performance factors, such as manifold vacuum, revolutions per minute, load, or the like, which are not measurable by these patents. Moreover, the cited patents adjust the pressure within each cylinder separately, thereby limiting the response to separate cylinder adjustments rather than overall engine performance. In addition, none of the patents use positive acting cams for adjusting the compression within the power cylinder, but rather use atmospheric pressure from the main combustion chamber or manual means for adjusting the compression piston.

SUMMARY OF THE INVENTION

The present invention is based upon the concept of providing a pair of four cycle power cylinders to which a lean air/fuel mixture is delivered, with a two cycle charge cylinder functioning to compress a rich air/fuel mixture on each of its charging strokes, alternately delivering the rich air/fuel mixture to the power cylinders by way of appropriate valves. Each power cylinder has a charge chamber of variable volume whereby the compression ratio of the power cylinder itself is varied in response to the power requirements of the engine. The rich air/fuel mixture from the charge cylinder is first delivered to the charge chamber and ignition occurs in the charge chamber and the flame front moves therefrom into the compressed lean air/fuel mixture in the power cylinder. A valve controls the flow of the rich air/fuel mixture between the charge cylinder and the charge chamber and in addition restricts the flow between the charge chamber and the power cylinder in one position and in the other position permits free flow between the charge chamber and the power cylinder; the restricted flow between the charge chamber and the power cylinder providing a variable air/fuel ratio from the charge chamber to the power cylinder over which the flame front will travel for complete combustion of the lean air/fuel mixture in said power cylinder.

BRIEF DESCRIPTION OF PREFERRED EMBODIMENTS

Figure 1:
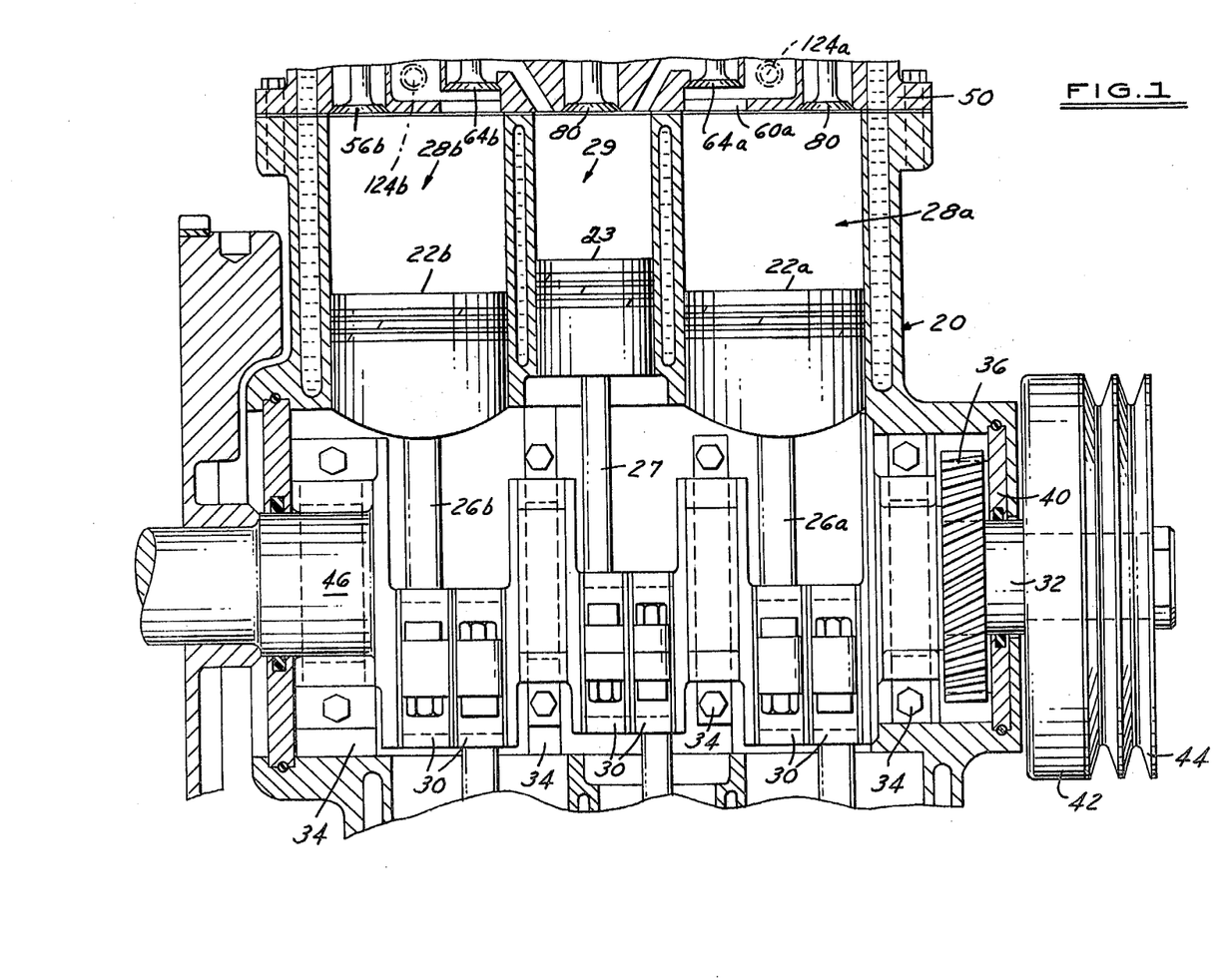
FIG. 1 is a fragmentary cross-sectional view showing a representative V-type piston engine embodying the invention having four power cylinders and two charge cylinders, with their piston rods arranged on a common crankshaft.

Referring now to FIG. 1, there is illustrated a portion of an internal combustion engine embodying the invention having high fuel economy, low noxious emissions, and high power characteristics, in which a pair of two cycle charge cylinders each alternately supplies an air/fuel mixture to an associated pair of four cycle power cylinders. While a V-type piston engine has been illustrated, it will be apparent to those skilled in the art that in-line or opposed firing type engines may also utilize my teachings herein disclosed. In the illustrative embodiment the engine comprises an engine block 20 having four power cylinders and two charge cylinders each having pistons reciprocating therein. The pistons are constructed in a manner commonly known in the art, having piston heads 22a, 22b, 23, reciprocated by piston rods 26a, 26b, 27, which are secured to rod bearings 30 on a crankshaft 32. The crankshaft 32 has been constructed in a manner common in the art of V-type engines comprising journal bearings 34 and rod bearings 30 along its length. Each oppositely aligned pair of rod bearings 30 are secured to a common crankpin. Consequently, when one piston is on its compression stroke, the opposite piston journalled to the common crankpin would be either on its intake or power stroke. Since the power pistons and associated charge pistons are aligned along a common crankshaft, when the pair of power pistons are on their compression stroke, the associated charge piston will be on its charging stroke. The forward end of the engine is defined by an annular crankshaft gear 36 driving the engine camshaft, and an oil seal 40. Also on the forward end of the crankshaft a vibration damper 42 and a pulley 44 are provided for driving the various external members of the engine. The rear of the crankshaft is secured by rear bearings 46 substantially adjacent a fly wheel.

Figure 2:
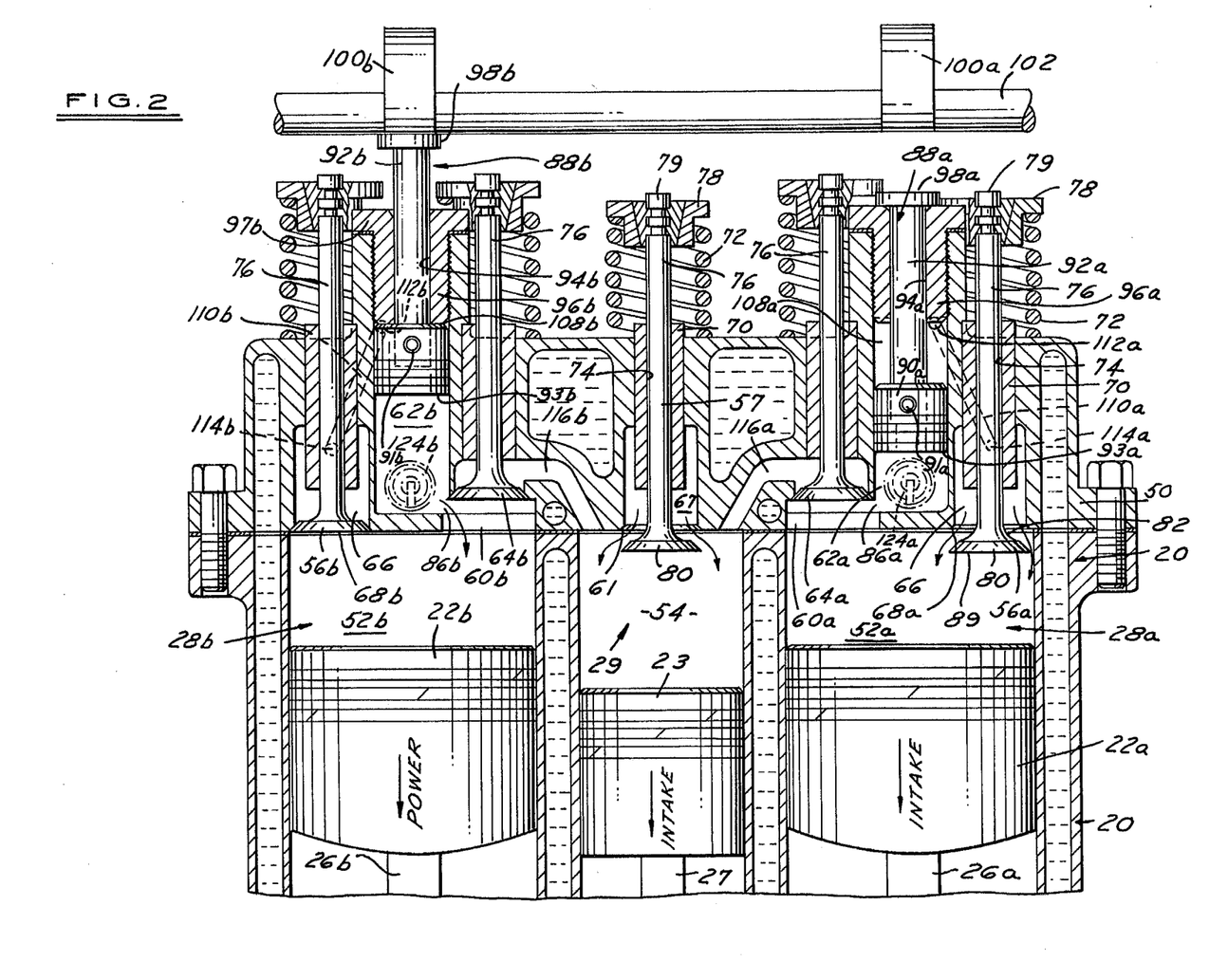
FIG. 2 is a cross-sectional view of one of the banks of cylinders of the engine of FIG. 1 taken along the line 2—2 of FIG. 8 with one power piston on its power stroke, the other power piston on its intake stroke and the charge cylinder piston on its intake stroke.
Figure 8:
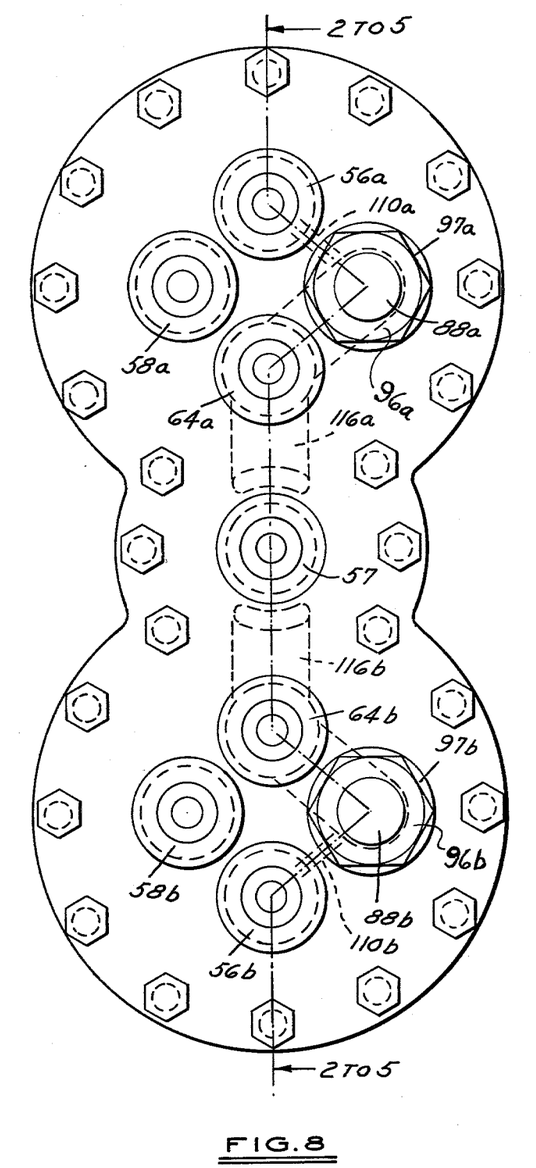
FIG. 8 is a plan view of the valves and ports of two power cylinders, the charge cylinder, the charge chambers, and the exhaust manifold for one bank of cylinders of the engine of FIG. 1.

FIG. 2 illustrates the construction of the power cylinders. Only one construction of a power cylinder will be described, since it is understood that each power cylinder is similarly constructed and consequently similarly numbered. In FIG. 2 a power cylinder 28a cooperates with piston 22a, engine head 50, and engine block 20 to define a main combustion chamber 52a having means for delivering an air/fuel mixture to the power cylinder, an exhaust valve 58a whose location is best seen in FIG. 8, and a power cylinder port 60a communicating with a charge chamber 62a and a charge cylinder valve 64a. The means for delivering an air/fuel mixture comprise a lean manifold valve 56a permitting delivery of a lean air/fuel mixture through intake port 68a from lean manifold 66. The air/fuel mixture is supplied to the lean manifold 66 from a conventional carburetor or other suitable means, not shown, and I do not intend to limit myself to any particular carburetor means. During high load periods or during starting of the engine, the air/fuel mixture to the power cylinder may be substantially rich in fuel. However, the air/fuel mixture within the lean manifold 66 may be leaned out by its associated carburetor which permits the engine to run substantially on a rich air/fuel mixture delivered to a charge chamber during light load periods as fully explained below.

Each valve 56a, 56b, 64a, 64b, 57 comprises a normal poppet valve having a sleeve 70 defining a bore 74 having a stem 76 reciprocating therein for opening and closing of the valve. Adjacent the upper end of the stem 76 an annular stop 78 is provided for cooperating with manifold 50 to retain spring 72 in a substantially compressed condition. Each stem has a valve head 80 at its lower end having an angular upper surface 82 and a face 89. The upper surface 82 of the valve provides a surface against which fuel from the manifold or passageway can abut and be directed into the chamber. The face 89 of the valve is preferably contoured in a manner consistent with the swirl of the combustion chamber and the desired combustion sequence of the flame front. Moreover the head could be of any shape or design consistent with the described embodiment. The valve is normally biased closed by spring 72 such that fuel is not permitted to flow into the combustion chambers. A conventional camshaft/rocker arm apparatus (not shown), or any other means commonly known in the art, can be used to force the valves downward in synchronism with the crankshaft for providing timely fuel flow to the combustion chambers.

Figures 3, 6:
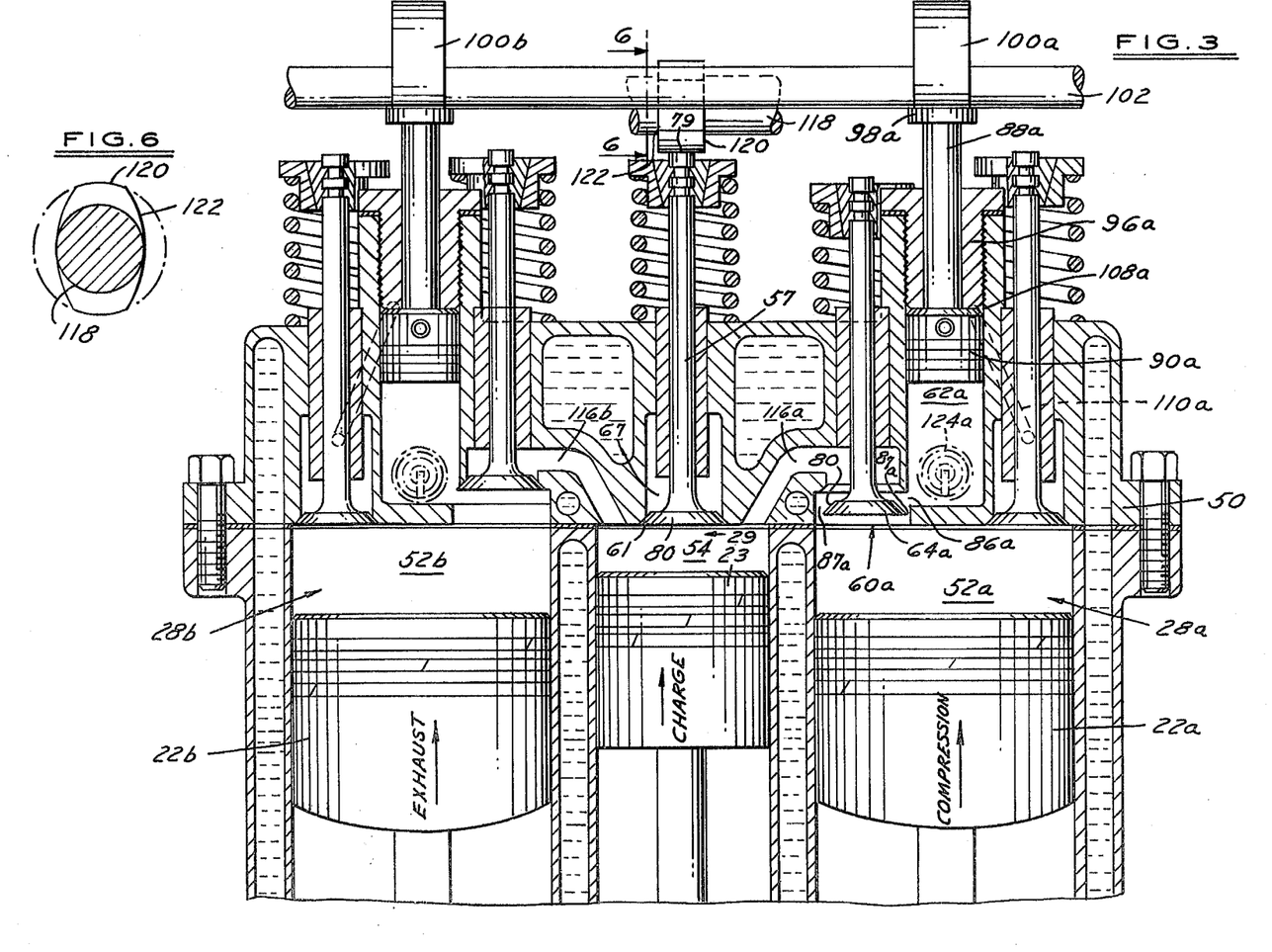
FIG. 3 is similar to FIG. 2 but with one power piston on its exhaust stroke, the other power piston on its compression stroke, and the charge cylinder piston on its charging stroke.
FIG. 6 is a cross-sectional view taken along lines 6—6 of FIG. 3 of the cam and cam lobe for opening and closing of the charge cylinder intake valve.

Valve means are provided by a charge cylinder valve 64a constructed in a manner consistent with the description above. The charge cylinder valve 64a, when open, restricts the power cylinder opening 60a thereby directing the principal part of an air/fuel mixture from a charge cylinder 29 into a charge chamber 62a, as best seen in FIG. 3. However, it should be noted that small amounts of the air/fuel mixture will flow into the main combustion chamber around open valve 64a, since the valve does not close the entire opening 60a. Normally, the flow around valve 64a will increase when the pressure within main combustion chamber 52a is less than that above valve 64a. In addition, a portion of the air/fuel mixture from the charge cylinder will strike the valve head 80 on its upper angular surface 82 thereby further agitating the mixture and assisting in flow of the mixture to the charge chamber 62a.

Charge chamber 62a includes means for varying the effective volume of the charge chamber, and thereby varying the compression within the power cylinder in response to the power requirements of the engine, such as by sensing changes in intake manifold pressure. The charge chamber 62a is defined by engine head 50, a plunger sleeve 96a, and ignition means 124a. The means for varying the effective volume of the charge chamber include a plunger 88a which varies the compression of the air/fuel mixture within the charge chamber 62a and power cylinder 28a in response to manifold pressure or any other suitable engine characteristic. The plunger 88a is of conventional small piston construction having a plunger head 90a with a wall 93a facing the interior of the charge chamber, a plunger rod 92a slidable within a bore 94a defined by sleeve 96a threadedly received in the engine head 50, and an end portion 98a extending radially outward from the axis of the plunger rod 92a, said end portion 98a serving as a stop surface for defining upward and downward travel of the plunger. The plunger head 90a is floatingly connected to the plunger rod 92a by a pin 91a. The plunger sleeve 96a is provided with an annular lip portion 97a having an hexagonal periphery as best seen in FIG. 8 to facilitate assembly of the sleeve to the engine head 50. In operation, normally the intake stroke of the power piston will draw the plunger to its furthest downward position, whereby end portion 98a abuts the upper surface of guide sleeve 96a, consequently limiting the volume of lean air/fuel mixture entering charge chamber 62a upon intake of the lean air/fuel mixture through lean fuel manifold 66.

Figures 5, 7:
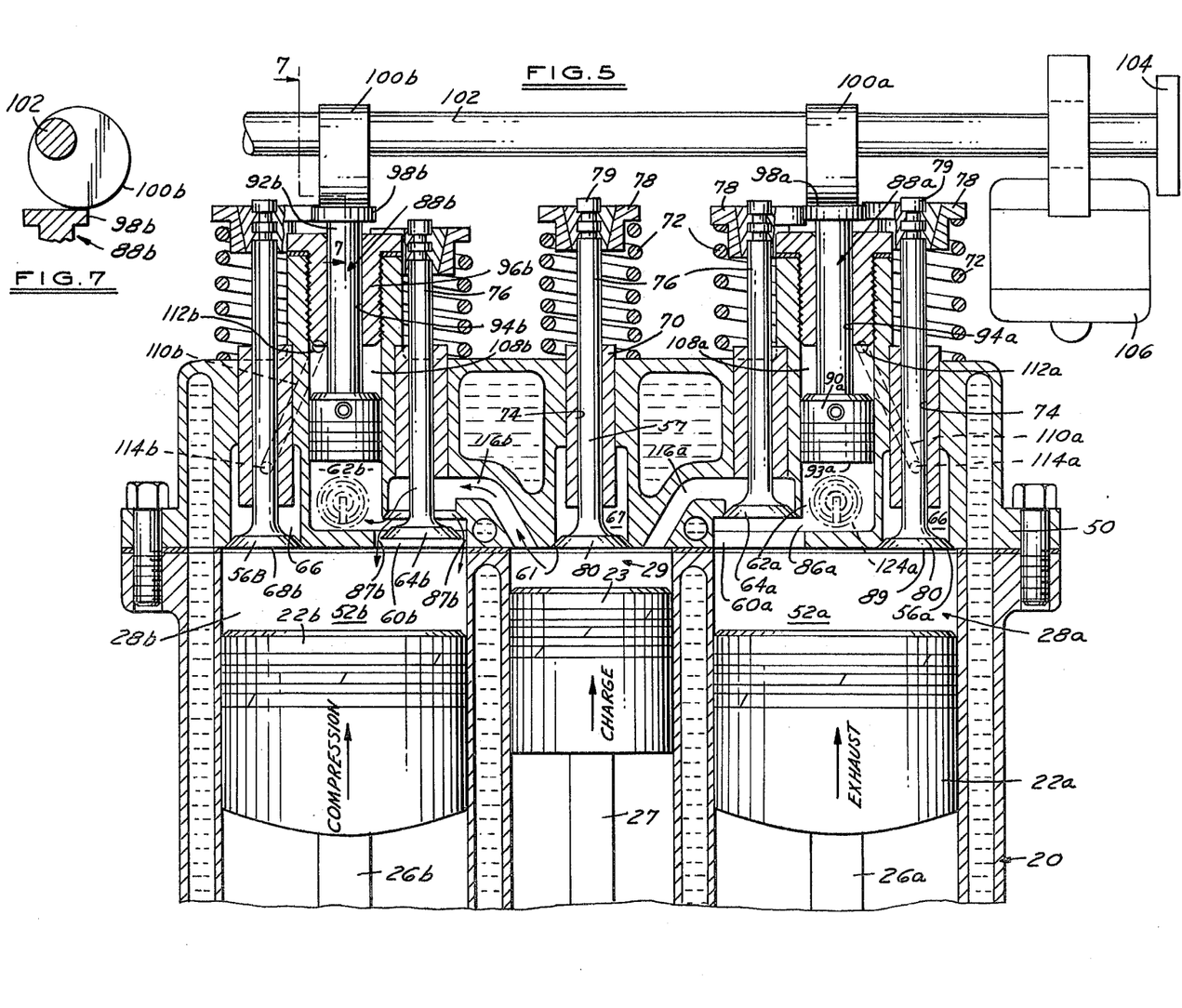
FIG. 5 is similar to FIG. 2 but with one power piston on its compression stroke, the other power piston on its exhaust stroke, and the charge cylinder piston on its charging stroke.
FIG. 7 is a cross-sectional fragmentary view taken along lines 7—7 of FIG. 5 of the cam lobe of the plunger cam.

Upward travel of the plunger is variably defined by means selectively positioning the plunger as shown in FIGS. 5 and 7 and comprising a cam lobe member 100a on camshaft 102 which is mounted on the engine by suitable supports and bearings, not shown, and is rotatable toward and from said plunger for limiting the plunger's movement in response to engine performance factors, such as manifold pressure, as explained more fully below.

When the radially outward surface of cam lobe 100 is rotated to a position where it abuts the upper surface of the plunger's end portion 98a prior to ignition, the two surfaces will momentarily, but not rigidly, lock. During explosion of the mixture this locking relationship is enhanced and is preferably released upon rotation of the cam lobe or commencement of the intake stroke of the power piston.

Figure 9:
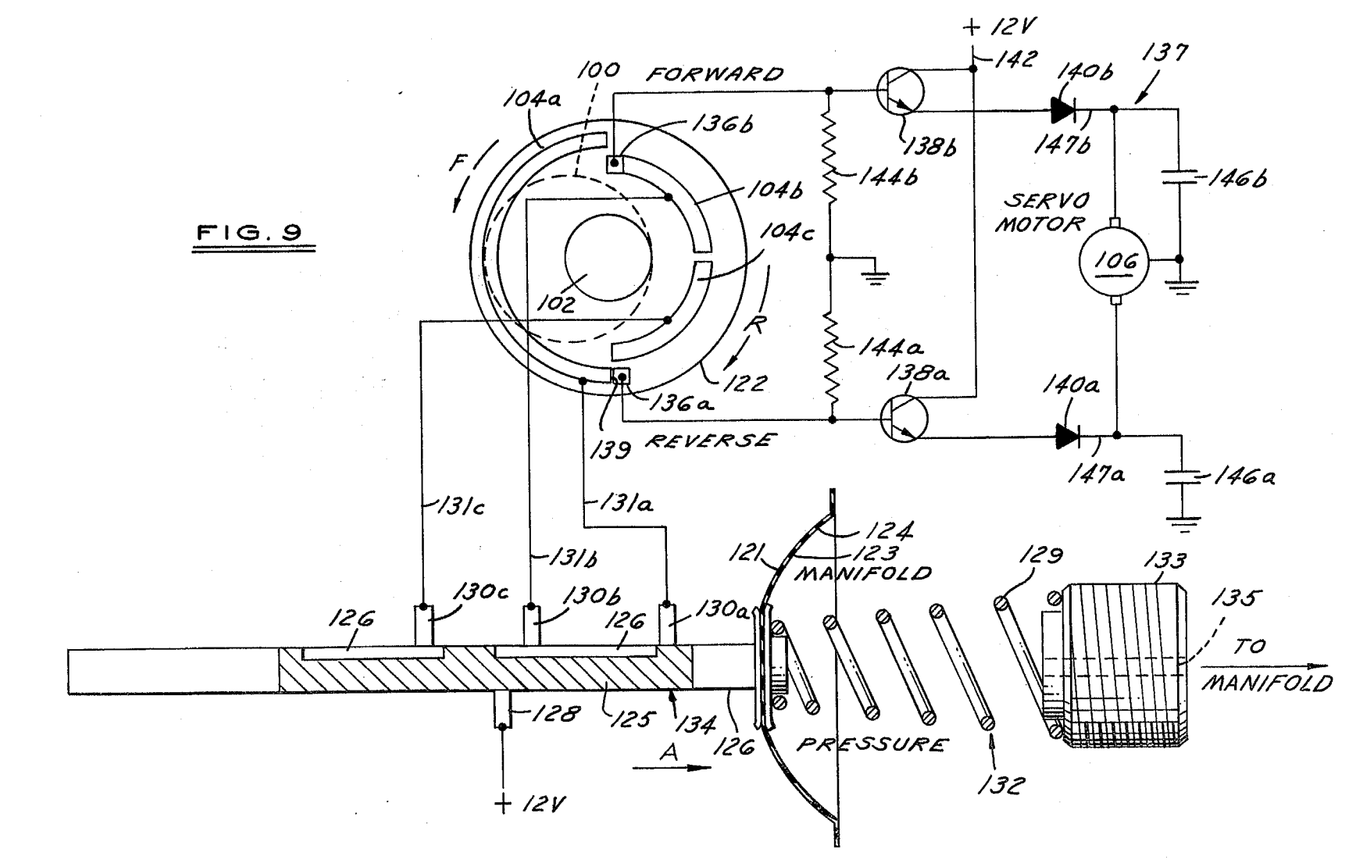
FIG. 9 is a schematic view of a sensing and actuating circuit for the engine.

Rotational movement of camshaft 102 to locations corresponding to sensed pressures within an intake manifold is provided by sensing and actuating means shown schematically in FIGS. 5 and 9. Camshaft 102 has a series of camshaft lobes 100 each associated with a plunger 88 reciprocating within a charge chamber 62. Abutment by cam lobes 100 limits vertical travel of the plungers 88. Accordingly, by adjustably rotating camshaft 102, cam lobes 100 can be positioned such that plungers 88 have no vertical movement, thereby assuming a chamber contracted position, or the plungers can have larger degrees of vertical movement thereby assuming chamber expanded positions. It should be noted, however, that full vertical movement of the plunger 88 will permit the plunger head 90 to scavenge the charge chamber 62 and draw lubricating oil to the walls of the chamber. It will also be noted that several constructions of the camshaft and sensing and actuating circuit could be used and it is to be understood that the construction of the regulating apparatus of the engine is not to be limited by this particular embodiment. For example, it would be evident to one skilled in the art that the engine would work equally well by individual regulation of the plungers rather than one camshaft setting the vertical movement of all the plungers.

As best shown in FIG. 9, camshaft 102 is integrally secured to, but is insulated from, a drum 122 such that rotation of camshaft 102 rotates drum 122 an equal angular distance. A plurality of slip rings 104a,b,c are affixed to the inner cylindrical surface of drum 122 such that rotational movement of camshaft 102 likewise rotates slip rings 104a,b,c an equal angular distance. Current is supplied to slip rings 104 by their respective connectors 131a,b,c which are connected to commutator brushes 130a,b,c. The commutator brushes 130a,b,c sweep a commutator 134 or multi-position switch having a non-conductive shaft 126 and a conducting surface 125. Conducting surface 125 is connected to a power source 128 and can be made of any suitable conductive material. Brushes 130a,b,c and commutator 134 are positioned such that inward movement of commutator 134 in the direction of arrow A, and in response to decreasing pressure within the intake manifold, permits source 128 to sequentially activate brushes 130a, 130b and 130c, preferably activating one brush at any one instant. A diaphragm 124 assists in moving commutator 134 laterally by responding to changes in pressure within the intake manifold. Diaphragm 124 is located such that surface 123 faces a chamber, not shown, pressurized by intake manifold pressure. The opposite surface 121 of diaphragm 124 is exposed to ambient atmospheric pressure. When the pressure within the intake manifold is normal or less than atmospheric, as when the engine responds to a low load condition, ambient atmospheric pressure acts against diaphragm 124 to urge the diaphragm inward against a spring assembly 132. Spring assembly 132 comprises a threaded member 133 which provides a seat for spring 129 and is adjustable such that adjustment of member 133 determines the resistance to compression of spring 129. Spring 129 is also tapered for maintaining uniform movement of commutator 134 when spring 129 is compressed. Threaded member 133 also provides a port 135 which at one end communicates with the intake manifold and at the other end communicates with surface 123 of diaphragm 124. Accordingly, when pressure within the intake manifold approaches ambient atmospheric pressure as when the engine responds to an increasing load, spring assembly 132 urges diaphragm 124 outwardly in a direction opposite to that of arrow A, thereby also moving commutator 134 outward.

The sensing and actuating circuit is also provided with a connecting circuit 137 having a servo-motor 106 for rotating the camshaft 102 and drum 122 in a reverse direction or a forward direction to locations corresponding to a sensed pressure within the intake manifold. In addition, the connecting circuit 137 includes contact means comprising a pair of contact brushes 136a,b repeatedly communicating with their associated slip rings 104a,b,c such that activation of any slip ring activates its associated contact brush when the contact brush is sweeping the slip ring. Contact brushes 136a,b each communicate with one of the separable portions of the connecting circuit 137. Contact brush 136a communicates with the reverse rotation portion of circuit 137 and contact brush 136b communicates with the forward rotation portion of circuit 137. Consequently, brushes 136a,b separably activate associated transistors 138a,b, said transistors acting as a switch to open and close the associated circuit portions controlling motor 106. Biasing resistors 144a,b are connected parallel to transistors 138a,b for retaining the transistors in a closed condition until the current flowing through the bias resistors from source 142 is overcome by current from source 128 thereby permitting the transistors to conduct current through the associated circuit. Closure of the associated circuit by activation of the transistor's base substantially permits power source 142 to communicate with servo-motor 106 through blocking diodes 140a,b for rotating the camshaft 102 in the appropriate direction. Blocking diodes 140a,b maintain the current in a direction toward the servo-motor 106 rather than in the reverse direction which could result in damage to the transistors. Capacitance means are also provided wherein two capacitors 146a,b are located parallel to each side of servo-motor 106. When current is conducted along either conductor 147a or 147b, the corresponding capacitor 146a or 146b is charged and remains charged until current conduction is terminated along the associated conductor. When current conduction is terminated along the associated conductor, charged capacitor 146a or 146b discharges its stored current to the appropriate side of servo-motor 106 thereby driving the servo-motor momentarily longer in the same direction as the motor was previously driven.

In operation, the sensing and actuating circuit senses the atmospheric pressure within the intake manifold for the power cylinder as shown schematically in FIG. 9. If atmospheric pressure within the intake manifold is at or slightly below ambient atmospheric pressure, and diaphragm 124 and commutator 134 are beginning to move inward in the direction of arrow A and against spring assembly 132 from the diaphragm's most outward position, the first commutator brush to be activated will be brush 130a. Contact of brush 130a with conductive surface 125 permits communication of source 128 with conductor 131a and slip ring 104a. If brush 136a is contacting the surface of slip ring 104a, current from source 128 will be conducted to transistor 138a thereby permitting source 142 to substantially activate servo-motor 106 on its reverse side, since transistor 138a actuates the reverse portion of circuit 137. Activation of the reverse side of servo-motor 106 drives drum 122 in a reverse direction, thereby rotating camshaft 102 to a position permitting maximum vertical travel of plunger 88 as shown in FIGS. 3 and 9. As brush 136a crosses the end 139 of slip ring 104a, the brush 136a stops communicating current from source 128 to transistor 138a, thereby terminating conduction of current to motor 106. If slip ring 104a and brush 136a are permitted to remain sufficiently close for brush 136a to intermittently contact slip ring 104a after deactivation of motor 106, oscillating movement of drum 122 could result from the proximity of the slip ring and the brush. Such oscillating movement of the drum is highly undesirable, since it could potentially damage the sensing and actuating circuit. According to the invention, however, I have provided capacitors 146a,b for eliminating this oscillating movement. Consistent with the described embodiment, capacitor 146a will discharge stored current from the reverse portion of circuit 137 when the circuit is deactivated, further driving motor 106 and rotating drum 122 such that brush 136a is completely disconnected from contact with slip ring 104a.

Assuming that the manifold pressure further decreases with respect to ambient atmospheric pressure, as when the engine comes under increasingly light load conditions, commutator 134 continues to move laterally in the direction of arrow A toward spring assembly 132 and positions conducting surface 125 in contact with commutator brush 130b. When commutator brush 130b contacts conducting surface 125, brushes 130a and 130c contact non-conducting surface 126 and remain contacting said surface until brush 130b no longer contacts conducting surface 125. Source 128 conducts current through brush 130b and connector 131b to slip ring 104b. Brush 136b sufficiently communicates with slip ring 104b when brush 136a is separated from slip ring 104a, that activation of slip ring 104b energizes servo-motor 106 rotating drum 122 in a forward direction, locating cam lobes 100 such that plungers 88 have partial vertical movement. As brush 136b slides past the end of slip ring 104b having rotated the drum 122 approximately 90°, motor 106 is no longer energized by power source 142, but is momentarily energized by discharge of capacitor 146b driving slip ring 104c into contact with brush 136b.

Accordingly, as commutator 134 and diaphragm 124 increasingly compress spring assembly 132 under decreasing manifold pressure, brush 130c will eventually communicate with source 128 thereby conducting current to slip ring 104c across conductor 131c. Since brush 136b already contacts slip ring 104c after sweeping slip ring 104b, the forward portion of circuit 137 is again activated energizing motor 106 on its forward side and rotating drum 122 in a forward rotation an additional 90° until brush 136b separates from slip ring end 141.

The drum 122 and camshaft 102 have now completed the maximum rotation, preferably 180°, permitted by the sensing and actuating circuit. Cam lobes 100 substantially limit vertical movement of plungers 88 while the camshaft 102 is rotated to this position. However, brush 136a remains in communication with slip ring 104a such that when pressure in the manifold again approaches ambient atmospheric pressure, commutator brush 130a will be activated by source 128 and slip ring 104a will be rotated in a reverse direction by motor 106 until drum 122 again assumes the position shown in FIG. 9.

It should also be noted that brush 136a remains in communication with slip ring 104a whenever there is forward rotation of camshaft 102. Accordingly, if commutator brush 130b has just communicated with conducting surface 125 thereby locating brush 136b on slip ring 104c, a sudden equalization of manifold pressure to ambient atmospheric pressure will permit brush 130a to communicate with conducting surface 125, rotating drum 122 in a reverse direction to the location as shown in FIG. 9.

During various strokes of the power cylinder, the plungers 88 frequently become freely movable. For example, when one plunger 88b is positioned by the camshaft during its power stroke as in charge chamber 62b of FIG. 2, the plunger 88a in charge chamber 62a of the opposite power cylinder 28a is freely movable in its charge chamber and is constrained by fluid pressure actuator means comprising a portion 108a communicating with the lean manifold 66; said communication being provided by passageway 110a which communicates with portion 108a by providing an opening at 112a into portion 108a and an opening at 114a into lean manifold 66 above port 68a. Consequently, the portion 108a of the charge chamber above the plunger head 90a will contain the same pressure as that existing in lean manifold 66. When higher pressure is present in lean manifold 66, and consequently in portion 108a, than in the charge chamber 62a, plunger 88a will be moved downward tending to equalize the pressures within charge chamber 62a above and below the plunger head 90a. Upon compression of the air/fuel mixture in power cylinder 28a, plunger 88a will be moved upward since the pressure on the wall 93a of the plunger head 90a will be greater than that existing in portion 108a. However, upward travel of the plunger head 90a is restricted by the rate at which the lean air/fuel atmosphere within portion 108a, acting as a fluid pressure actuator, can exit through the restricted opening at 112a. Consequently, the plunger 88a will be cushioned against a sharp rise, as if it were a dashpot, by the lean air/fuel existing behind the plunger head 90a in portion 108a. The dashpot effect of the restricted opening at 112a will reduce knocking and assist in lubrication of the plunger by drawing oil vapor to the walls of the charge chamber 62a from the upper valve area.

Construction of plunger 88a should not be limited to the particular embodiment described. The plunger could be a screw threaded plug for example which could be set to various levels of fixed compression. Use of a screw threaded plug requires the air/fuel mixtures to be varied to provide an appropriately varying combustible mixture. The most desirable construction is of the plunger type, which is movable in response to measurable engine performance characteristics such as manifold pressure. In addition, a plunger permits the engine to be regulated by various factors, i.e., during high load periods the plunger will desirably set the compression of the air/fuel mixture at maximum performance. However, during light load periods, one need not be concerned with maximizing output, but could adjust the compression for maximum burning of hydrocarbons or oxides. Consequently, the plunger's variability is particularly effective in maximizing engine performance over a wide variety of factors.

In accordance with the invention, a central two cycle charge cylinder 29 is also provided and is located between each pair of four cycle power cylinders 28a, 28b alternately supplying an air/fuel mixture to the charge chamber 62a, 62b of each power cylinder. The axes of the power cylinders and the associated charge cylinder are substantially parallel to each other and the axes of the power cylinders are symmetrical about the axis of the charge cylinder. The charge cylinder 29 is defined by a charge piston head 23, the engine block 20, the engine head 50, and passageway means 116a, 116b, said means providing a path for injecting and compressing the air/fuel mixture alternately into charge chambers 62a, 62b. Normally the air/fuel mixture within the charge cylinder is a rich air/fuel mixture and will be discussed as such. However, separate carburetion of the charge cylinder mixture by a carburetor, not shown, but conventional in construction, although I do not intend to limit myself to any particular carburetor means, permits varying fuel ratios of the charge cylinder mixture. Preferably, in all conditions except cold starting, the air/fuel ratio of the mixture delivered to the charge cylinder will remain constant. Only the air/fuel ratio of the mixture delivered to the power cylinder will vary.

Means are provided for inducting the air/fuel mixture to the charge cylinder. Such means is shown as comprising a charge cylinder intake valve 57 which has a similar construction as that of a common poppet valve as described above, having a compression spring 72, and guide sleeve 70 for guiding vertical movement of a valve stem 76 within a bore 74 and sealing valve head 80 against cylinder port 61 when valve 57 is closed. It should be noted, however, that the means for inducting the air/fuel mixture to the charge cylinder can be of any conventional design, such as a reed valve or the like. Downward movement of valve 57 is dependent on rotation of cam 118 and the position of cam lobes 120 for opening and closing of valve head 80 against engine head 50 as shown in FIGS. 3 and 6. For example, as the upper end 79 of valve 57 remains adjacent the central portion 122 of cam 118, the valve remains closed. When cam lobe 120 abuts the upper end 79 of valve 57, the valve head 80 separates downward from engine head 50 permitting the rich air/fuel mixture from rich fuel manifold 67 to enter charge cylinder chamber 54 through port 61. The manifold fuel is drawn into the cylinder chamber 54 by the pressure of the rich fuel manifold and the intake stroke of piston 23. Shaft 118 is rotated sequentially with the engine camshaft as an integral part of that camshaft (not shown) or by linkage means commonly known in the art. The air/fuel mixture injected into the charge cylinder 29 will normally have a richer fuel content than that injected into the power cylinders to retain the richer fuel adjacent the ignition means upon combustion. However, during high load periods the air/fuel mixture injected into the power cylinders may be richer than that injected into the charge cylinder. Consequently, as discussed above, it would be advantageous to have two carburetors or a double carburetor (not shown) in conventional form supplying the separate mixtures to the appropriate manifolds.

In operation, when charge cylinder piston 23 reaches its bottom dead center position, valve 57 closes, valve 64 associated with the power piston on its intake strokes opens, and piston 23 starts its charging stroke forcing the fuel into either passageway 116a or 116b. Accordingly, since charge cylinder piston 23 leads the appropriate power piston 22a or 22b, the power piston will be completing its intake stroke when charge cylinder valve 64 initially opens. It should be noted, however, that the construction of the crankshaft is such at top dead center and bottom dead center the charge piston and the power piston appear to reach these positions at substantially the same instant. Consequently, the power piston will not greatly increase the vacuum within combustion chamber 52a when the charge cylinder valve 64 initially opens.

As charge piston 23 ascends on its charging stroke, the air/fuel mixture within charge cylinder 29 will be injected and compressed into the appropriate charge chamber through the associated passageway. The charge cylinder valve 64 which is associated with the power cylinder on its exhaust stroke will remain closed throughout the charging stroke although a portion of the air/fuel mixture within charge cylinder 29 will collect in its associated passageway. When the appropriate charge cylinder valve 64 opens, valve head 80 of valve 64 will substantially block opening 60, but will permit partial communication between charge chamber 62 and combustion chamber 52 since the valve head does not entirely block opening 60 but forms an annular restricted orifice 87 between valve 64 and opening 60. Consequently, some of the rich air/fuel mixture from the charge cylinder will be dispersed through the orifice 87. During the completion of the power piston's intake stroke the dispersal of the rich air/fuel mixture through the orifice 87 into the power cylinder will be enhanced. Likewise when the power piston starts its compression stroke, the compression within the main combustion chamber 52 of the lean air/fuel mixture will oppose dispersal of the rich air/fuel through orifice 87. The dispersal of a portion of the rich air/fuel mixture through the annular restricted orifice 87 formed by valve 64 and opening 60 creates a variance in richness of the air/fuel mixture from charge chamber 62 to the main combustion chamber 52, the richer fuel being located in charge chamber 62. Progressively leaner air/fuel from charge chamber 62 to main combustion chamber 52 creates a path by which the flame front can travel upon ignition.

Since the charge cylinder piston 23 generally leads the power piston 22, the charge cylinder piston 23 will finish its charging stroke and valve 64 will be closed prior to the power piston reaching its ignition position. In the time interval between closure of valve 64 and ignition of the air/fuel mixture by ignition means 124, the rich air/fuel mixture from the charge chamber 62 is permitted to commingle with the lean air/fuel mixture primarily in the area occupied by valve 64 when opened. Commingling of the two air/fuel mixtures will create further variation in the richness of the fuel mixtures. However, if plunger 88 is freely movable and therefore moving upward in response to compression of the air/fuel mixture by power piston 22, the variable richness of the air/fuel mixture between the combustion chambers will be limited. Accordingly, if cam shaft 102 has rotated to a position where vertical movement of plunger 88 is limited by cam lobes 100, the consequent increase in compression of the rich air/fuel mixture within charge chamber 62 would assist in dispersing the rich air/fuel mixture into the compressed lean air/fuel mixture in the power cylinder further varying the richness of the air/fuel mixture between the charge chamber and the power cylinder as compared to the air/fuel ratio effect of a freely movable plunger.

FIGS. 2-5 illustrate the sequential operation of the engine. FIG. 2 shows a power cylinder 28a on an intake stroke receiving a lean air/fuel mixture from the lean fuel manifold 66 through open valve 56a. Lean air/fuel from the lean fuel manifold will vary in fuel richness from pure air to a rich fuel, depending upon load conditions. Adjustment of the fuel level within the lean fuel manifold would be performed by a separate carburetor. The lean air/fuel mixture is substantially inducted into the power cylinder by the vacuum created from the intake stroke of piston 22a. Plunger 88a will be at its lowermost position, with radially extending end 98a abutting the upper surface of guide sleeve 96a, since the vacuum created by downward movement of piston 22a will also act on piston 88a, drawing it downward.

Charge cylinder 29 will also be on its intake stroke receiving a rich air/fuel mixture from the rich fuel intake manifold 67. Intake pressure for the charge cylinder 29 comprises a combination of carburetor manifold pressure and intake vacuum created by the intake stroke of charge cylinder piston 23. The rich air/fuel mixture is supplied by a carburetor which is also adjustable in response to engine performance. Downward movement of valve 57 is provided by valve end portion 79 abutting cam lobe 120 as best shown in FIG. 3. Downward movement of valve 57 permits valve head 80 to separate from engine head 50 permitting manifold 67 to communicate with charge cylinder 29 through port 61. A portion of the rich fuel so injected through port 61 will strike the valve head 80 further agitating the mixture and preparing it for ignition.

Power cylinder 28b of FIG. 2 is shown in its power stroke. The explosion and subsequent flame front occur just after closure of the charge cylinder valve 64b. The flame front sweeps through the unrestricted orifice 86b and port 60b into the main combustion chamber 52b, expanding into the lean air/fuel mixture in the power cylinder. The thrust of the explosion of the fuel is transmitted by piston 22b and piston rod 26b to crankshaft 32 thereby driving the engine. In addition, the thrust of the explosion retains piston 88b in its uppermost position, which is shown at minimum compression.

FIG. 3 illustrates the further progression of the engine wherein power piston 22a compresses the lean air/fuel mixture within main combustion chamber 52a. Charge cylinder valve 64a is shown as opened permitting the rich air/fuel mixture from charge cylinder 29 to enter charge chamber 62a. Movement of charge cylinder valve 64a to an open position does not entirely close opening 60a, but permits small amounts of rich air/fuel to enter the main combustion chamber 52a through annular restricted orifice 87a thereby creating a variable air/fuel mixture between the charge chamber 62a and the power cylinder 28a. However, the flow of rich air/fuel around valve head 80 of charge cylinder valve 64a is opposed by compression of the lean air/fuel mixture within chamber 52a. The compression of the rich and lean air/fuel mixtures exerts an upward force on plunger 88a normally driving the plunger upward until the plunger head 90a abuts the bottom surface of sleeve 96a or, alternatively, the plunger end 98a abuts cam lobe 100a. The upward travel of plunger 88a is resisted or opposed by the lean air/fuel mixture which is trapped within chamber 108a behind plunger head 90a and escapes through passageway 110a as the plunger travels upward, thereby providing a dashpot effect. The location of cam lobe 100 in FIG. 3 indicates that minimum compression of the air/fuel mixture is required such as during heavy load conditions.

Charge cylinder piston 23 will reach its top dead center position prior to power piston 22a reaching a similar position due to the charge cylinder piston's timing lead. Upon charge cylinder piston 23 reaching its top dead center position, charge cylinder valve 64a will close, permitting communication through unrestricted orifice 87a and opening 60a between charge chamber 62a and main combustion chamber 52a. Prior to ignition, a portion of the rich air/fuel mixture will mix with the lean air/fuel mixture in the area previously occupied by the open charge cylinder valve 64a. Mixture of the two gases assists in atomization and richness variation of the combined mixtures and provides a path by which the flame front can travel. As the power piston 22a reaches its ignition position, the ignition means 124a will fire and ignite the rich air/fuel mixture within charge chamber 62a thereby providing a flame front, which first burns the mixture within the charge chamber 62a and then sweeps through the unrestricted orifice 86a and cylinder opening 60a into the main combustion chamber 52a where the impact of the explosion will force the power piston 22a downward.

Power piston 22b will be on its exhaust stroke in FIG. 3 exhausting the gas residue from the main combustion chamber 52b out exhaust port 58b, best shown in FIG. 8. The exhaust port 58b uses a poppet valve construction similar to that described for valves 64a, 64b, 57, 56a and 56b (see FIG. 8), and is also driven for timed sequence by linkages extending from crankshaft 32.

Figure 4:
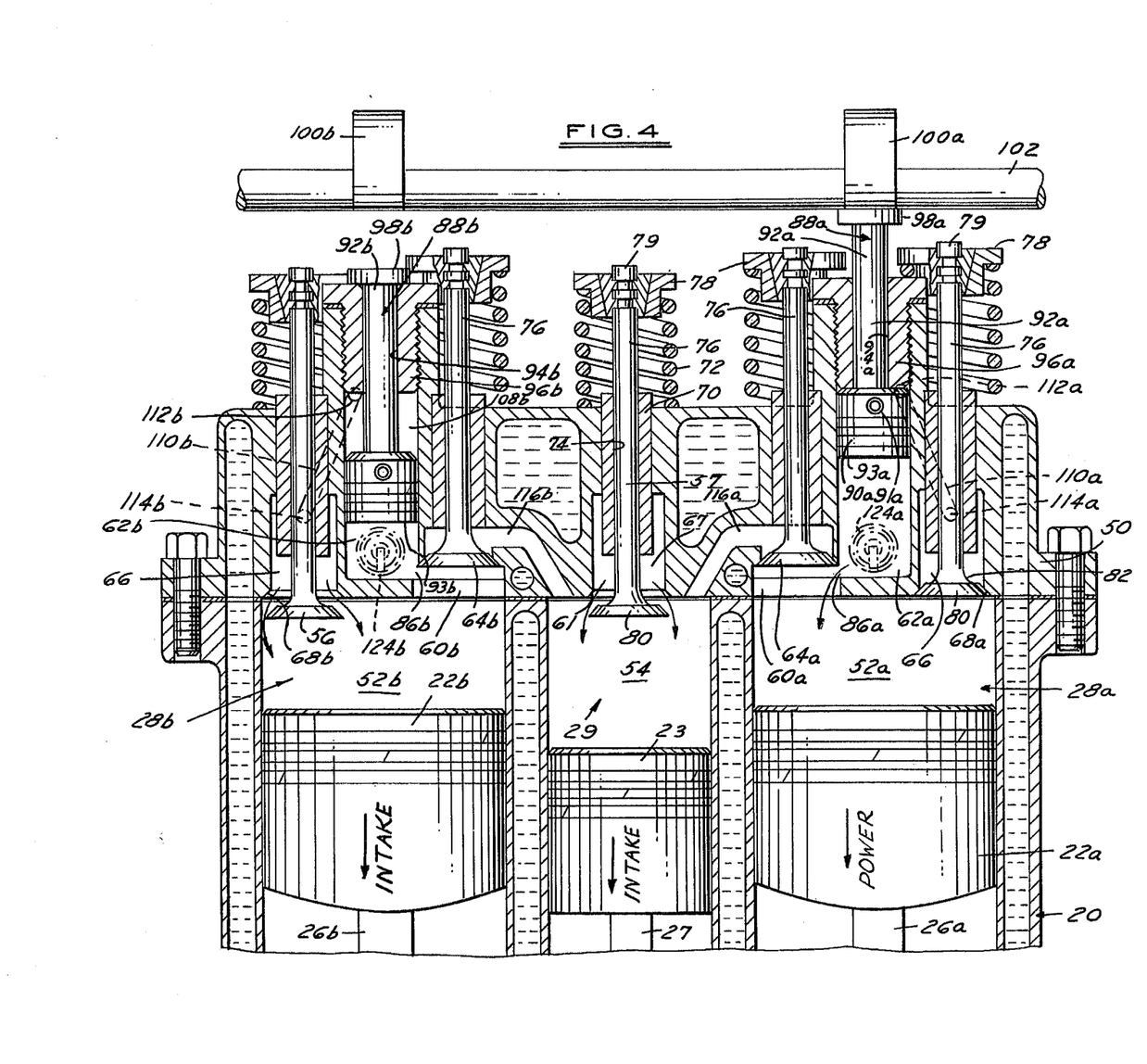
FIG. 4 is similar to FIG. 2 but with one power piston on its intake stroke, the other power piston on its power stroke, and the charge cylinder piston on its intake stroke.

FIGS. 4 and 5 illustrate the last two cycles for power cylinders 28a and 28b which consists of reversing the roles of each power cylinder as previously described for FIGS. 2 and 3. Charge cylinder 29 again completes the two cycles as previously described, but injects fuel into cylinder 28b rather than cylinder 28a. More specifically, FIG. 4 shows cylinder 28a in a power stroke while cylinder 28b is on an intake stroke and fed with a lean air/fuel mixture from manifold 66. Charge cylinder 29 is shown as being fed with a rich air/fuel mixture from manifold 67.

FIG. 5 shows the reciprocal operation of FIG. 3 wherein power cylinder 28a is on its exhaust stroke and power cylinder 28b is on its compression stroke. Charge cylinder 29 is on its charging stroke. FIG. 5 also shows servo-motor 106 having responded to an engine performance factor such as manifold pressure under a light load condition, by rotating shaft 102 using the slip rings 104 such that cam lobes 100 restrict vertical movement of plungers 88. When cylinder 28b enters its compression cycle the pressure within the charge chamber 62b forces plunger 88b upward. However, the cam lobe 100b restricts upward movement of plunger 88b thereby resulting in a greater compression ratio in the power cylinder as compared to the effect shown in FIG. 3. In addition, upon closure of charge cylinder valve 64b, the increased compression within charge chamber 62b will further force the rich air/fuel mixture into the lean air/fuel mixture prior to ignition. Because of the rapid and greater dispersal of rich air/fuel within the main combustion chamber, the power cylinder air/fuel mixture can be substantially leaned out under lighter loads.

What is claimed is:

1. An internal combustion engine comprising: a pair of four cycle power cylinders, means for delivering an air/fuel mixture to each of the power cylinders, a variable volume charge chamber for each power cylinder communicating therewith, a two cycle charge cylinder for alternately supplying an air/fuel mixture to the charge chambers, means for delivering an air/fuel mixture to the charge cylinder, and valve means between the charge cylinder and charge chambers for controlling flow therebetween and for substantially segregating the air/fuel mixture delivered from the charge cylinder to the charge chamber from the air/fuel mixture within the power cylinder when the valve means permits communication between the charge chamber and the charge cylinder.

2. The invention defined by claim 1 wherein said valve means is shiftable to a position restricting flow between the charge chamber and the power cylinder.

3. The invention defined by claim 1 wherein said charge chamber has a movable wall for varying the effective volume thereof to vary the compression ratio of the power cylinder.

4. The invention defined by claim 3 wherein said movable wall comprises a plunger in the chamber.

5. The invention defined by claim 3 wherein the movable wall draws lubrication to the charge chamber during movement from its chamber expanded to its chamber contracted positions.

6. The invention defined by claim 3 wherein means are provided for exposing one side of said wall to the intake manifold pressure for said power cylnder and said wall is shiftable in response to the differential between said intake manifold pressure and charge chamber pressure.

7. The invention defined by claim 6 wherein said means for exposing one side of said wall to intake manifold pressure comprises a fluid pressure actuator buffering movement of the wall during compression stroke of the power cylinder.

8. The invention defined by claim 3 wherein means are provided for selectively positioning said wall.

9. The invention defined by claim 8 wherein the means for positioning said wall comprises cooperating screw threaded portions.

10. The invention defined by claim 8 wherein said means for positioning said wall includes a camshaft cooperating with the wall to position the same within the charge chamber.

11. The invention defined by claim 8 wherein said means for selectively positioning the said wall includes a member having a surface shiftable toward and from said wall for limiting its outward movement.

12. The invention defined by claim 1 wherein a movable wall is freely floating in response to pressure differential in a lean intake manifold and the power cylinder and means for selectively positioning the wall in a direction expanding the charge chamber.

13. The invention defined by claim 1 wherein the said means for delivering an air/fuel mixture to each of the power cylinders includes a variable air/fuel manifold for selectively inducting a lean air/fuel mixture into the power cylinders.

14. The invention defined by claim 13 wherein means for delivering an air/fuel mixture to the charge cylinder includes a rich fuel manifold inducting a rich air/fuel mixture into the charge cylinder.

15. The invention defined by claim 14 wherein the said rich air/fuel mixture flows into the power cylinder through an opening in the charge chamber when the valve means is in a position blocking flow between the charge cylinder and the charge chamber.

16. The invention defined by claim 1 wherein said charge chamber includes ignition means for igniting the fuel mixture therein.

17. The invention defined by claim 16 wherein there is an opening for conducting the flame front from the charge chamber to the power cylinder.

18. The invention defined by claim 1 wherein the axes of said charge cylinder and associated pair of power cylinders are parallel to each other and the axis of the power cylinders are symmetrical about the axis of the charge cylinder.

19. The invention defined by claim 1 wherein said charge cylinder supplies its air/fuel mixture to the charge chamber prior to a power piston within an associated power cylinder reaching its ignition position and during its compression stroke.

20. The invention defined by claim 1 wherein the valve means during the compression stroke of the power cylinder restricts the flow between the charge chamber and the power cylinder and permits free communication between the charge chamber and the power cylinder when the charge cylinder is substantially at top dead center.

21. The invention defined by claim 1 wherein the charge cylinder and the pair of associated power cylinders each have a piston for vertical movement therein and said charge cylinder piston leads the associated power cylinder pistons as they move vertically.

22. The invention defined by claim 21 wherein the valve means opens when the charge cylinder piston reaches its bottom dead center position and the power pistons are on their intake strokes.

23. The invention defined by claim 1 wherein said charge chamber includes a wall movable between chamber contracting and chamber expanding positions and operable to force more of the air/fuel mixture delivered from the charge cylinder into the power cylinder when located at its contracting position.

24. The invention defined by claim 1 wherein said means for delivering an air/fuel mixture to the power cylinders is operable to vary the fuel content of the mixture from fuel free air to a rich air/fuel.

25. The invention defined by claim 1 wherein said valve means has a valve head such that the air/fuel mixture flowing between the charge cylinder and the charge chamber strikes the valve head prior to entry into the charge chamber.

26. The invention defined by claim 1 wherein passageway means establishes communication between the charge cylinder, charge chamber and power cylinder, and said valve means is in said passageway means and shiftable between a position blocking flow through the passageway with respect to the charge cylinder and another position restricting flow with respect to the power cylinder while permitting flow between the charge cylinder and charge chamber.

27. The invention defined by claim 26 wherein said passageway means comprises a passageway between the charge cylinder and each power cylinder.

28. The invention defined by claim 1 wherein there are a plurality of pairs of power cylinders with the pairs of pistons arranged in opposition to each other and having a crankshaft common thereto and said pistons in each pair of cylinders having piston rods journalled to common crankpins on said crankshaft.

29. The invention defined by claim 1 wherein each pair of power cylinders and their associated charge cylinder are connected to a common crankshaft.

30. The invention defined by claim 1 wherein the charge cylinder attains its top dead center position prior to the power cylinder attaining its top dead center position.

31. The invention defined by claim 1 wherein the air/fuel mixture delivered to the power cylinder is supplied on the intake stroke and the air/fuel mixture flowing to the charge chamber from the charge cylinder is supplied substantially on the compression stroke of the power cylinder.

32. The invention defined by claim 1 wherein each pair of four cycle cylinders alternates their respective strokes every two cycles, such that when one power cylinder is on its power stroke, the other power cylinder is on its intake stroke and after two cycles, the one power cylinder will be on its intake stroke and the other power cylinder will be on its power stroke.

33. The invention defined by claim 1 wherein means are provided for causing each pair of four cycle power cylinders and their associated charge cylinder to reach their respective top dead center positions and their respective bottom dead center positions at substantially the same time.

34. The invention defined by claim 1 wherein said means for delivering an air/fuel mixture includes an intake manifold.

35. The invention defined by claim 33 wherein means are provided responsive to pressure in the intake manifold for varying the volume of the charge chamber.

36. The invention defined by claim 35 wherein said means for varying the volume of the charge chamber includes a camshaft rotatively positioned in response to changes in intake manifold pressure.

37. The invention defined by claim 36 wherein said camshaft is rotated by an electric motor.

38. The invention defined by claim 36 wherein said means for varying the volume of the charge chamber includes sensing and actuating means for positioning the camshaft in response to changes in manifold pressure.

39. The invention defined by claim 38 wherein said sensing and actuating means comprises a multi-position switch.

40. The invention defined by claim 39 wherein said multi-position switch comprises a commutator adjustably positioned by a diaphragm sensing changes in the intake manifold pressure.

41. The invention defined by claim 39 wherein said sensing and actuating means comprises a drum having slip rings disposed thereon for electrically controlling a circuit, said circuit also driving a motor for rotating the camshaft and the drum.

42. The invention defined by claim 41 wherein said slip rings are rotated an equal angular distance with rotation of the camshaft.

43. The invention defined by claim 41 wherein a commutator communicates with said slip rings for electrically activating said slip rings in response to commutator position.

44. The invention defined by claim 41 wherein said slip rings electrically control the motor to rotate the camshaft through a maximum arc of 180°.

45. The invention defined by claim 44 wherein contact means sweep said slip rings for connecting said slip rings with said motor.

46. The invention defined by claim 45 wherein said motor has a forward side for rotating the camshaft in a forward direction and a reverse side for rotating said camshaft in a reverse direction.

47. The invention defined by claim 45 wherein said sensing and actuating means has a forward circuit connected to the forward side of said motor and a reverse circuit connected to the reverse side of said motor.

48. The invention defined by claim 47 wherein capacitance means are provided for retaining and discharging current to said motor when the said circuits are opened.

49. An internal combustion engine comprising: at least one power cylinder having at least a compression stroke and a power stroke, first means for delivering a variable first air/fuel mixture to said power cylinder, a charge chamber for receiving a second air/fuel mixture, second means for delivering said second air/fuel mixture to said charge chamber, valve means movable between an open position allowing free flow of said second air/fuel mixture from said second means to said charge chamber and simultaneously limiting flow of said second air/fuel mixture into the first air/fuel mixture in said power cylinder and a closed position preventing flow between said second means and respectively said charge chamber and said power cylinder while allowing open communication between said charge chamber and said cylinder.

50. The invention as defined in claim 49 including ignition means for igniting said second mixture in said charge chamber whereby ignition occurs in said charge chamber and the flame front proceeds from said charge chamber to said power cylinder while said valve means is in said closed position.

51. The invention as defined in claim 50 wherein said charge chamber has a movable wall for varying the volume thereof to vary the compression ratio of said power cylinder.

52. The invention as defined in claim 51 including means for varying said first air/fuel mixture and moving said movable wall in response to engine performance characteristics.

53. The invention as defined in claim 52 wherein said second means includes a charge cylinder, and including a common crank shaft, said power cylinder and said charge cylinder being stroked by said common crank shaft.

54. An internal combustion engine comprising: a pair of four cycle power cylinders, means for delivering an air/fuel mixture to each of said power cylinders, a charge chamber for and communicating with each of said power cylinders, a two cycle charge cylinder for alternately supplying an air/fuel mixture to said charge chambers, means for delivering an air/fuel mixture to said charge cylinder, passageway means establishing communication between said charge cylinder and each of said charge chambers and the respective associated power cylinders, valve means disposed in said passageway means and movable between: an open position forming a restriction in the flow path into said each power cylinder for allowing free flow from said charge cylinder to each of said charge chambers and restricted flow to the associated power cylinders in said open position; and a closed position preventing flow from said charge cylinder to said charge chambers and the associated power cylinders for allowing open communication between said charge chambers and the associated power cylinders in said closed position while preventing flow therefrom back to said charge cylinder.

55. The invention defined by claim 54 including ignition means for igniting the mixture in said charge chambers whereby ignition occurs in said charge chambers and the flame front proceeds from each charge chamber to the associated power cylinder.

56. The invention defined by claim 55 wherein said means for delivering said air/fuel mixture to said power cylinders includes means for varying the ratio of the air to fuel mixture.

57. The invention as defined in claim 55 wherein said means for delivering an air/fuel mixture to said power cylinders includes means for varying the ratio of the air to fuel mixture in response to engine performance characteristics.

58. The invention as defined in claim 55 wherein each of said charge chambers has a movable wall for varying the effective volume thereof to vary the compression ratio of the associated power cylinder.

59. The invention as defined in claim 58 including means for selectively positioning said movable wall to selectively change the volume of said charge chamber.

60. The invention as defined in claim 58 including means for selectively positioning said movable wall in response to engine performance characteristics.

61. The invention as defined in claim 60 wherein said means for delivering air/fuel mixture to said power cylinders includes means for varying the ratio of the air to fuel mixture in response to engine performance characteristics.

62. A method for operating an internal combustion engine of the type having a power cylinder and an adjacent communicable charge chamber with a first means for supplying a first variable air/fuel mixture to the power cylinder and a second means for supplying a second air/fuel mixture to the charge chamber and an ignition means in the charge chamber comprising the steps of; charging the charge chamber with the second air/fuel mixture while limiting introduction of the second air/fuel mixture into the power cylinder, variably charging the power cylinder with the first variable air/fuel mixture in response to engine performance characteristics, closing communication from the second means to the charge chamber and the power cylinder, opening communication between the charge chamber and the power cylinder, and igniting the second air/fuel mixture in the charge chamber so that the flame front proceeds from the charge chamber into the power cylinder.

* * * * *